(12) United States Patent
Zhang

(10) Patent No.: US 10,897,431 B2
(45) Date of Patent: Jan. 19, 2021

(54) CLOUD RESOURCE PROCESSING METHOD AND PHYSICAL NODE

(71) Applicant: HUAWEI TECHNOLOGIES CO., LTD., Guangdong (CN)

(72) Inventor: Ni Zhang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 12 days.

(21) Appl. No.: 16/230,348

(22) Filed: Dec. 21, 2018

(65) Prior Publication Data

US 2019/0124018 A1 Apr. 25, 2019

Related U.S. Application Data

(63) Continuation of application No. PCT/CN2017/090516, filed on Jun. 28, 2017.

(30) Foreign Application Priority Data

Jul. 1, 2016 (CN) .......................... 2016 1 0519312

(51) Int. Cl.
*H04L 12/911* (2013.01)
*G06F 9/50* (2006.01)
(Continued)

(52) U.S. Cl.
CPC ........ *H04L 47/829* (2013.01); *G06F 9/45558* (2013.01); *G06F 9/5077* (2013.01);
(Continued)

(58) Field of Classification Search
CPC ..... H04L 47/829; H04L 47/822; H04L 41/00; H04L 41/12; G06F 9/5077;
(Continued)

(56) References Cited

U.S. PATENT DOCUMENTS 9,141,683 B1 * 9/2015 Nagargadde ........ G06F 11/1464
9,146,721 B1 * 9/2015 Nagaraja ................... G06F 8/60
(Continued)

FOREIGN PATENT DOCUMENTS

| CN | 103095788 A | 5/2013 |
| CN | 103269364 A | 8/2013 |

(Continued)

OTHER PUBLICATIONS

Collins dictionary, "subnet," Jul. 9, 2020.*
(Continued)

*Primary Examiner* — Alina A Boutah
(74) *Attorney, Agent, or Firm* — Womble Bond Dickinson (US) LLP

(57) ABSTRACT

The present disclosure relate to a cloud resource processing method includes: determining a cloud resource; obtaining a dependent cloud resource of the cloud resource and a resource information group of the cloud resource, where the resource information group includes resource information of the dependent cloud resource; generating a resource topology template; and cloning or migrating the cloud resource based on the resource topology template. According to the cloud resource processing method and the physical node in the embodiments of the present disclosure, clone or migration processing of a plurality of cloud resources can be automatically completed, so as to improve replication efficiency.

14 Claims, 10 Drawing Sheets

(51) Int. Cl.
H04L 12/24 (2006.01)
G06F 9/455 (2018.01)

(52) U.S. Cl.
CPC ............ H04L 41/00 (2013.01); H04L 47/822 (2013.01); *G06F 2009/4557* (2013.01)

(58) Field of Classification Search
CPC ............... G06F 9/45558; G06F 9/5088; G06F 2009/4557; G96F 2009/4557
See application file for complete search history.

(56) References Cited

U.S. PATENT DOCUMENTS

| | | | |
|---|---|---|---|
| 9,361,092 B1* | 6/2016 | Bai | G06F 8/65 |
| 2008/0163171 A1* | 7/2008 | Chess | G06F 9/5077 |
| | | | 717/120 |
| 2008/0163194 A1* | 7/2008 | Dias | G06F 8/60 |
| | | | 717/174 |
| 2008/0294777 A1* | 11/2008 | Karve | G06F 8/60 |
| | | | 709/226 |
| 2013/0227558 A1* | 8/2013 | Du | G06F 9/45558 |
| | | | 718/1 |
| 2013/0346619 A1* | 12/2013 | Panuganty | H04L 41/12 |
| | | | 709/226 |
| 2014/0052773 A1* | 2/2014 | Deng | H04L 67/42 |
| | | | 709/203 |
| 2015/0172183 A1 | 6/2015 | Decusatis et al. | |
| 2015/0207703 A1* | 7/2015 | Gallagher | G06F 11/3006 |
| | | | 709/224 |
| 2016/0055021 A1* | 2/2016 | Beveridge | G06F 9/45558 |
| | | | 718/1 |
| 2016/0239595 A1* | 8/2016 | Maes | G06F 9/5061 |
| 2016/0254965 A1* | 9/2016 | Maes | H04L 67/10 |
| | | | 709/223 |
| 2016/0380916 A1* | 12/2016 | Gnaneswaran | G06F 9/46 |
| | | | 709/224 |
| 2017/0093640 A1* | 3/2017 | Subramanian | H04L 41/12 |
| 2017/0139734 A1* | 5/2017 | Cropper | G06F 9/45558 |
| 2017/0193021 A1* | 7/2017 | Deng | G06F 16/2228 |
| 2017/0228246 A1* | 8/2017 | Kotha | G06F 9/45558 |
| 2018/0329700 A1* | 11/2018 | Doshi | G06F 8/75 |
| 2019/0052528 A1* | 2/2019 | Yoshimura | H04L 41/0806 |
| 2019/0052551 A1* | 2/2019 | Barczynski | H04L 41/12 |
| 2020/0044919 A1* | 2/2020 | Yao | H04L 41/0893 |

FOREIGN PATENT DOCUMENTS

| | | |
|---|---|---|
| CN | 103475544 A | 12/2013 |
| CN | 103746997 A | 4/2014 |
| CN | 103957261 A | 7/2014 |
| CN | 104508625 A | 4/2015 |
| WO | 2011041159 A1 | 4/2011 |

OTHER PUBLICATIONS

Anonymous, Creating the clone of an OpenStack virtual machine with its bootable and data disks in ElastiStor, retrieved from http://www.docs.cloudbyte.com/wp-content/uploads/OpenStack_creating_clone_of_vm.pdf, Dec. 25, 2018, 3 pages.

Xu Qi-chun et al, Study on Technical Framework for Cloud Computing in Large Enterprises. Electric Power IT, vol. 9, No. 8, 2011, 4 pages.

* cited by examiner

CLOUD RESOURCE PROCESSING METHOD AND PHYSICAL NODE

CROSS-REFERENCE TO RELATED APPLICATIONS

This application is a continuation of International Application No. PCT/CN2017/090516, filed on Jun. 28, 2017, which claims priority to Chinese Patent Application No. 201610519312.2, filed on Jul. 1, 2016. The disclosures of the aforementioned applications are hereby incorporated by reference in their entireties.

TECHNICAL FIELD

The present disclosure relates to the field of computer information, and in particular, to a cloud resource processing method and a physical node.

BACKGROUND

A complete cloud computing service may run on one or more virtual machines and enjoy a plurality of cloud services, such as a relational database service (RDS), S3, and elastic MapReduce (EMR). The cloud computing service may be cloned or migrated in a same cloud computing platform or between different cloud computing platforms. Specifically, there may be three application scenarios. A first scenario is that after being developed and tested by a private cloud, the cloud computing service does not need to be modified, and can be quickly released to any third-party public cloud for running; a second scenario is that the entire cloud computing service is cloned or migrated in a same cloud platform or between different cloud platforms; and a third scenario is that a part of the cloud computing service is migrated.

The cloning or migrating the entire cloud computing service includes cloning and migrating content such as a virtual machine, a virtual machine configuration, a cloud service configuration, and a networking configuration between virtual machines. The virtual machine configuration may include attribute information such as a computer name, a specification, an image, a data volume, network adapter Media Access Control (MAC) address, a network, and metadata that are of the virtual machine. The networking configuration between the virtual machines includes information such as a subnet in which a virtual machine is located, a security group, and a router between networks. The cloud service configuration includes various configurations of a service.

Specifically, in an example in which a virtual machine is cloned, for cloning in a same cloud platform, for example, cloning a virtual machine in a same data center (DC), a source virtual machine that needs to be cloned is first selected, a snapshot or an image of the source virtual machine is established, and a destination virtual machine is created in the DC based on the snapshot or the image. For another example, for cloning a virtual machine in different DCs, a source virtual machine that needs to be cloned is first selected, a snapshot or an image of the source virtual machine is established, the snapshot or the image is downloaded and then uploaded to a destination DC for cloning, and a destination virtual machine is created in the destination DC based on the snapshot or the image. Therefore, in the existing clone technology, only a single virtual machine can be cloned, and other resources of the virtual machine need to be manually configured for cloning. Consequently, an error easily occurs, and configuration efficiency is low.

SUMMARY

This application provides a cloud resource processing method and a physical node, so as to improve clone and migration efficiency of a cloud resource.

According to a first aspect, a cloud resource processing method is provided. The method includes: determining a to-be-processed cloud resource; obtaining a dependent cloud resource of the to-be-processed cloud resource and a resource information group of the to-be-processed cloud resource, where the resource information group includes resource information of the dependent cloud resource; generating a resource topology template, where the resource topology template includes the resource information group of the to-be-processed cloud resource and a dependency relationship between the to-be-processed cloud resource and the dependent cloud resource; and cloning or migrating the to-be-processed cloud resource based on the resource topology template.

According to the cloud resource processing method in this application, the dependent cloud resource of the to-be-processed cloud resource and the resource information group of the to-be-processed cloud resource are obtained; the resource topology template that includes the resource information group of the to-be-processed cloud resource is generated, where the resource topology template can indicate the dependency relationship between the to-be-processed cloud resource and the dependent cloud resource; and the to-be-processed cloud resource may be cloned or migrated based on the resource topology template, so that one or more cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

Optionally, the to-be-processed cloud resource may include one or more cloud resources. Specifically, the to-be-processed cloud resource may include at least one of a virtual machine resource, a network resource, a volume resource, a load balancer (LB) resource, a security group resource, a stack resource, or a cloud service resource.

Optionally, the to-be-processed cloud resource may include a plurality of types of cloud resources or a plurality of cloud resources of a same type. For example, the to-be-processed cloud resource includes a plurality of virtual machine resources, so that the plurality of cloud resources can be cloned or migrated.

Optionally, the resource information group of the to-be-processed cloud resource may further include resource information of the to-be-processed cloud resource.

With reference to the first aspect, in an implementation of the first aspect, the to-be-processed cloud resource is a virtual machine resource; a dependent cloud resource of the virtual machine resource includes a flavor resource, a volume resource, and a network resource; and a resource information group of the virtual machine resource includes attribute information of the virtual machine resource, information about the flavor resource, information about the volume resource, and information about the network resource.

Optionally, the obtaining a dependent cloud resource of the to-be-processed cloud resource and a resource information group of the to-be-processed cloud resource includes:

parsing the virtual machine resource to determine the dependent cloud resource of the virtual machine resource, including the flavor resource, the volume resource, and the network resource; and determining the resource information group of the virtual machine resource, including the attribute information of the virtual machine resource, the information about the flavor resource, the information about the volume resource, and the information about the network resource.

Optionally, the virtual machine resource may be further parsed to determine another dependent cloud resource associated with the virtual machine resource, including at least one of a security group resource, an LB resource, or a cloud service resource. Correspondingly, the resource information group of the virtual machine resource further includes at least one of information about the security group resource, information about the LB resource, or information about the cloud service resource.

With reference to the first aspect and the foregoing implementation of the first aspect, in another implementation of the first aspect, the to-be-processed cloud resource is a network resource; a dependent cloud resource of the network resource includes a subnet resource of the network resource; and a resource information group of the virtual machine resource includes information about the subnet resource.

Specifically, the obtaining a dependent cloud resource of the to-be-processed cloud resource and a resource information group of the to-be-processed cloud resource includes: parsing the network resource to determine the subnet resource of the network resource and the information about the subnet resource, where the dependent cloud resource of the network resource includes the subnet resource, and the resource information group of the network resource includes the information about the subnet resource.

With reference to the first aspect and the foregoing implementations of the first aspect, in another implementation of the first aspect, the method further includes: determining, based on the information about the subnet resource, at least one router associated with the subnet resource, where the dependent cloud resource of the network resource may further include the at least one router; and parsing each of the at least one router to obtain information about each router, where the resource information group of the network resource includes the information about each router.

With reference to the first aspect and the foregoing implementations of the first aspect, in another implementation of the first aspect, the method further includes: determining, based on the information about the subnet resource, at least one router associated with the subnet; parsing the at least one router to obtain extranet information of each of the at least one router; and based on the extranet information of each router, determining a target router from the plurality of routers and obtaining information about the target router, where an extranet associated with the target router and a floating Internet Protocol (IP) address of a port of a virtual machine resource are in a same network, the dependent cloud resource of the network resource further includes the target router, and the resource information group of the network resource includes the information about the target router.

With reference to the first aspect and the foregoing implementations of the first aspect, in another implementation of the first aspect, the to-be-processed cloud resource is a volume resource; and a resource information group of the volume resource includes a size of the volume resource.

Specifically, the obtaining a dependent cloud resource of the to-be-processed cloud resource and a resource information group of the to-be-processed cloud resource includes: parsing the volume resource to determine the size of the volume resource, where the resource information group of the volume resource includes information that indicates the size of the volume resource.

Optionally, the volume resource may be further parsed to determine at least one of snapshot information, source volume information, volume type information, consistency group information, or mount information of the volume resource. In this case, the resource information group of the volume resource further includes the at least one of the snapshot information, the source volume information, the volume type information, the consistency group information, or the mount information. Correspondingly, a dependent cloud resource of the volume resource includes at least one of a snapshot resource, a source volume resource, a volume type resource, a consistency group resource, or a mount resource, and the mount resource may include one or more mounted instance resources.

Optionally, the consistency group information includes information about another volume resource in a same consistency group as the volume resource.

Optionally, the volume type information includes information about quality of service QoS associated with a volume type of the volume resource.

With reference to the first aspect and the foregoing implementations of the first aspect, in another implementation of the first aspect, the to-be-processed cloud resource is an LB resource; and a dependent cloud resource of the LB resource includes at least one of a flavor resource of the LB resource, a listener resource, a pool resource associated with each listener, a member resource in each pool, or a health monitor resource. Correspondingly, a resource information group of the LB resource includes at least one of information about the flavor resource of the LB resource, attribute information of the listener resource, attribute information of the pool resource, attribute information of the member resource, or attribute information of the health monitor resource.

Specifically, the obtaining a dependent cloud resource of the to-be-processed cloud resource and a resource information group of the to-be-processed cloud resource includes: parsing the LB resource to determine the at least one of the information about the flavor resource of the LB resource, the attribute information of the listener associated with the LB resource, the attribute information of the pool associated with each listener, the attribute information of the member in each pool, or the attribute information of the health monitor. The resource information group of the LB resource includes the at least one of the information about the flavor resource, the attribute information of the listener resource, the attribute information of the pool resource, the attribute information of the member resource, or the attribute information of the health monitor resource. The dependent cloud resource of the LB resource includes the at least one of the flavor resource, the listener resource, the pool resource, the member resource, or the health monitor resource.

Optionally, the attribute information of the listener resource includes a connection upper limit, description information of the listener, a protocol, a port, a Transport Layer Security (TLS) Protocol key container, and a TLS key list.

Optionally, the attribute information of the pool resource includes description information of the pool, an algorithm of the LB resource, a protocol, and the like.

Optionally, the attribute information of the member resource includes an IP address of each member.

Optionally, the attribute information of the health monitor resource includes a detection protocol type, an interval delay, an expiration time, a maximum quantity of times of retries, an Hypertext Transfer Protocol (HTTP) method, a Uniform Resource Locator (URL), and an expected return code.

With reference to the first aspect and the foregoing implementations of the first aspect, in another implementation of the first aspect, the to-be-processed cloud resource is a security group resource; a dependent cloud resource of the security group resource includes a security group rule; and a resource information group of the security group includes resource information of the security group rule.

Specifically, the obtaining a dependent cloud resource of the to-be-processed cloud resource and a resource information group of the to-be-processed cloud resource includes: parsing the security group resource to determine information about the security group rule of the security group resource, where the resource information group of the security group resource includes the information about the security group rule, and the dependent cloud resource of the security group resource includes the security group rule.

Optionally, the information about the security group rule includes a remote security group resource of the security group resource, and the remote security group resource may be parsed to determine resource information of the remote security group resource. The resource information group of the security group resource may further include the resource information of the remote security group resource, and the dependent cloud resource of the security group resource further includes the remote security group resource.

With reference to the first aspect and the foregoing implementations of the first aspect, in another implementation of the first aspect, the to-be-processed cloud resource is a stack resource; and a resource information group of the stack resource includes attribute information of the stack resource.

Specifically, the obtaining a dependent cloud resource of the to-be-processed cloud resource and a resource information group of the to-be-processed cloud resource includes: parsing the stack resource to determine the attribute information of the stack resource, where the resource information group of the stack resource includes the attribute information of the stack.

Optionally, the attribute information of the stack includes at least of: a capability of a stack, description information, a parameter, a name, description information of a template of the stack, a tag, a stack creation expiration time, or information indicating whether to roll back.

Optionally, the stack resource may be further parsed to determine parent stack information and child stack information that are of the stack, where a dependent cloud resource of the stack resource includes the parent stack resource and the child stack resource, and the resource information group of the stack resource may further include the parent stack information and the child stack information.

With reference to the first aspect and the foregoing implementations of the first aspect, in another implementation of the first aspect, the to-be-processed cloud resource is an RDS resource.

Specifically, the obtaining a dependent cloud resource of the to-be-processed cloud resource and a resource information group of the to-be-processed cloud resource includes: parsing the RDS resource to determine resource information of an instance served by the RDS resource, where a resource information group of the RDS resource includes the resource information of the instance.

Optionally, a dependent resource of the instance resource may include at least one of a flavor resource, a volume resource, a source instance resource, a datastore resource, a datastore-version, or a user resource. The resource information of the instance includes a name of the instance, information about the flavor resource, information about the volume resource, an available zone, a network, configuration information, information about the datastore resource, information about the datastore-version resource, and information about the source instance resource.

It should be understood that when the determined to-be-processed cloud resource includes a plurality of cloud resources of a same type, the plurality of cloud resources of the same type may share a resource. For example, two virtual machine resources may share a same volume resource. Therefore, the shared resource may be parsed to obtain resource information of the shared resource, and the resource information of the shared resource belongs to a resource information group of each of the plurality of cloud resources of the same type.

With reference to the first aspect and the foregoing implementations of the first aspect, in another implementation of the first aspect, the to-be-processed resource is located in a source cloud, and the cloning or migrating the to-be-processed cloud resource based on the resource topology template includes: sending the resource topology template to a destination cloud, to clone or migrate, in the destination cloud, the to-be-processed cloud resource in the source cloud based on the resource topology template.

It should be understood that the resource topology template is determined based on the dependent cloud resource of the determined to-be-processed cloud resource and the resource information group of the to-be-processed cloud resource. In a cloud, the to-be-processed cloud resource may be cloned or migrated based on the resource topology template. However, between clouds, the resource topology template needs to be sent from the source cloud to the destination cloud, and cloning or migration is completed in the destination cloud.

It should be understood that when a plurality of to-be-processed cloud resources are cloned or migrated, a part of the resource topology template may be generated for each to-be-processed cloud resource. Because there may be a shared resource for the plurality of to-be-processed cloud resources, the resource topology template may indicate a dependency relationship between the plurality of to-be-processed cloud resources. If there is no dependency relationship between the plurality of to-be-processed cloud resources, and there is no shared resource, a resource topology template of each to-be-processed cloud resource may be generated, the resource topology templates of all the resources may be integrated into one resource topology template, and there is no dependency relationship between the to-be-processed cloud resources indicated by each part of the resource topology template.

According to a second aspect, a physical node is provided, configured to perform the method in any one of the first aspect and the possible implementations of the first aspect. Specifically, the physical node includes a unit configured to perform the method in any one of the first aspect and the possible implementations of the first aspect.

According to a third aspect, a physical node is provided, including a memory and a processor, where the memory is configured to store an instruction, and the processor is configured to execute the instruction stored in the memory; and when the processor executes the instruction stored in the memory, the processor performs the method in any one of the first aspect or the possible implementations of the first aspect.

According to a fourth aspect, a computer readable medium is provided, and is configured to store a computer program, where the computer program includes an instruction used to perform the method in any one of the first aspect and the possible implementations of the first aspect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 1:
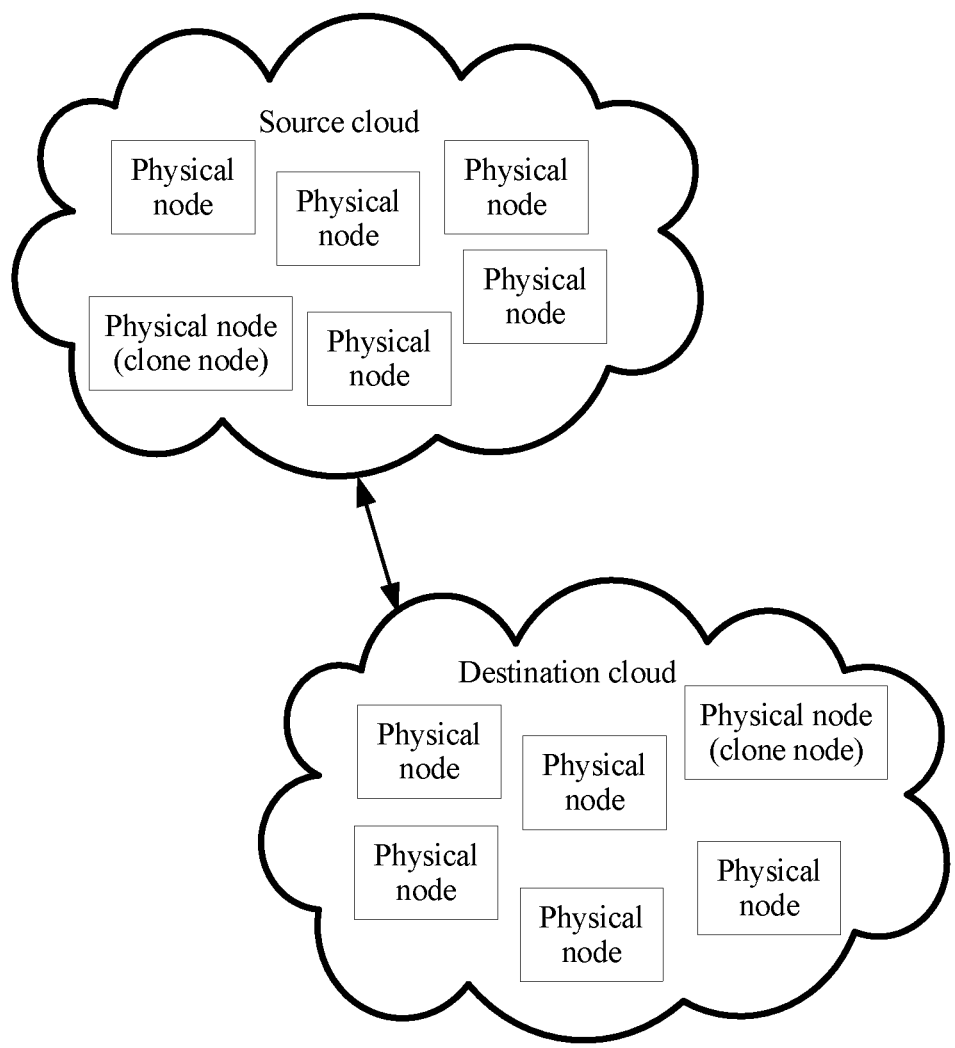
FIG. 1 is a schematic diagram of an application scenario according to an embodiment of the present disclosure.

FIG. 1 is a schematic diagram of an application background according to an embodiment of the present disclosure. In this embodiment of the present disclosure, cloning or migration of a cloud resource may be classified into inter-cloud processing and intra-cloud processing. The intra-cloud processing indicates that a cloud resource in any cloud, such as a cloud resource in a source cloud in FIG. 1, is cloned or migrated in the source cloud, and the cloned or migrated cloud resource is still located in the source cloud. The inter-cloud processing indicates that a cloud resource in any cloud, such as a cloud resource in a source cloud in FIG. 1, is cloned or migrated to a destination cloud, and the cloned or migrated cloud resource is located in the destination cloud.

Specifically, as shown in FIG. 1, for cloning or migration in a cloud or between clouds, an example herein in which cloning is performed in a source cloud is used for description. The source cloud includes one or more cloud resources, and also includes a plurality of physical nodes. The one or more cloud resources may be distributed in these physical nodes.

Optionally, these physical nodes include a clone node, and the clone node is configured to perform cloning on a cloud resource. For example, the clone node may include a processor, and the processor may be configured to perform cloning on a cloud resource in the cloud.

Optionally, these physical nodes include a cloud resource management module, and the cloud resource management module is configured to manage each cloud resource in the source cloud.

Optionally, the cloud resource management module may be located in the clone node. In this case, the clone node may obtain related resource information of a corresponding cloud resource by searching for the cloud resource management module, so as to complete cloning of the cloud resource.

Optionally, the cloud resource management module may not be located in the clone node. In other words, a physical node in which the cloud resource management module is located is different from the clone node. In this case, the clone node may obtain, by exchanging information with the physical node that includes the cloud resource management module, related resource information of a corresponding cloud resource in the cloud resource management module, so as to complete cloning of the cloud resource.

Figure 2:
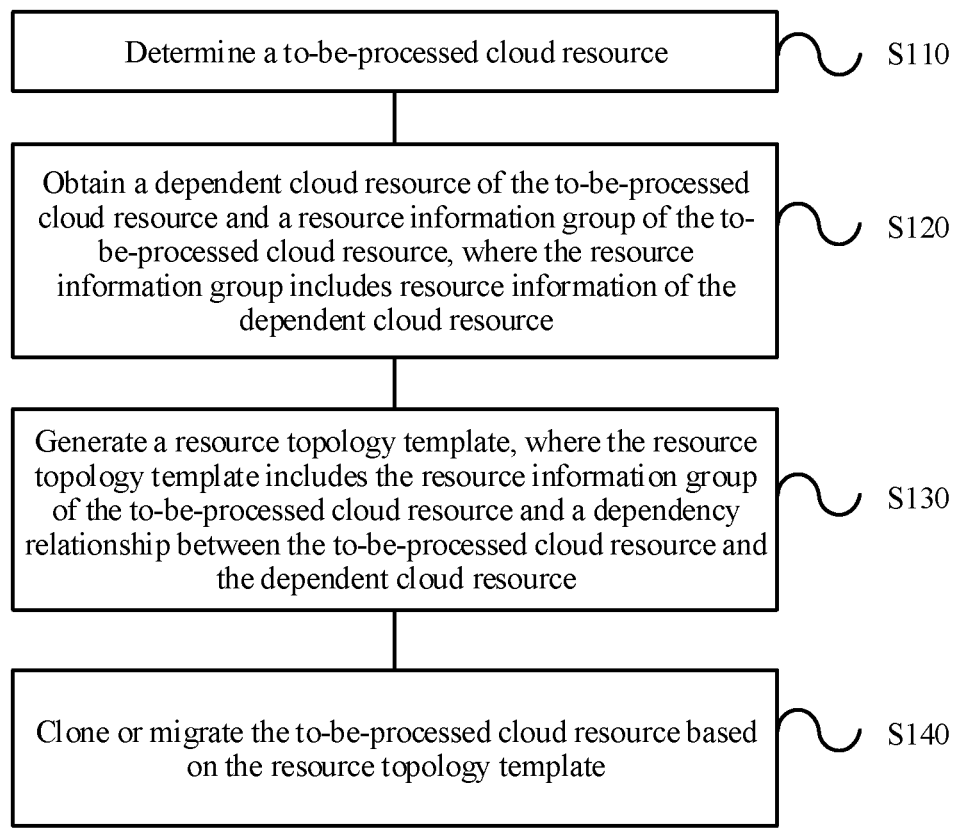
FIG. 2 is a schematic flowchart of a cloud resource processing method according to an embodiment of the present disclosure.

FIG. 2 is a schematic flowchart of a network resource processing method 100 according to an embodiment of the present disclosure. The method 100 may be performed by a virtual to virtual service (V2V service) in a cloud. For example, the V2V service may be located in a clone node in the source cloud shown in FIG. 1. As shown in FIG. 2, the method 100 includes the following steps.

S110. Determine a to-be-processed cloud resource.

In this embodiment of the present disclosure, when performing an inter-cloud or intra-cloud virtual machine clone or migration service, a user needs to select at least one to-be-processed cloud resource from the source cloud, and the processing includes clone processing or migration processing. Specifically, the to-be-processed cloud resource may include one or more of a virtual machine resource, a volume resource, a volume group resource, a shared resource, a network resource, a load balancer resource, a security group resource, a stack resource, and a cloud service resource. The cloud service resource may further include an RDS resource, an EMR resource, a MangoDB resource, and the like.

The user may select at least one cloud resource from the cloud resources for cloning or migration. The user may generate a cloud resource list by using the selected at least one cloud resource, where the cloud resource list may include a cloud resource ID or a filtering condition; determine, based on the cloud resource ID or the filtering condition, at least one cloud resource needs to be cloned or migrated, and enter a request that includes the cloud resource list into a server. The server obtains the request and determines the at least one to-be-processed cloud resource.

Optionally, the to-be-processed cloud resource may include a plurality of cloud resources of a same type. For example, the at least one cloud resource may include a plurality of virtual machine resources, a plurality of volume resources, or a plurality of virtual machine resources and a plurality of volume resources. This embodiment of the present disclosure is not limited thereto.

S120. Obtain a dependent cloud resource of the to-be-processed cloud resource and a resource information group of the to-be-processed cloud resource, where the resource information group includes resource information of the dependent cloud resource.

Specifically, the V2V service parses each of the determined at least one to-be-processed cloud resource to obtain a dependent cloud resource of each cloud resource and the resource information group of the to-be-processed cloud resource. The resource information group may include resource information of the dependent cloud resource of the cloud resource, and may further include resource information of the to-be-processed cloud resource.

It should be understood that, as shown in FIG. 1, the method 100 may be executed by a clone node. When the clone node may include a cloud resource management module, the clone node may obtain the dependent cloud resource of the to-be-processed cloud resource and the resource information group of the to-be-processed cloud resource by assessing the cloud resource management module. When the clone node does not include a cloud resource management module, the cloud resource management module is located in another physical node. In this case, the clone node may send request information to the physical node that includes the cloud resource management module, and obtain the dependent cloud resource of the to-be-processed cloud resource and the resource information group of the to-be-processed cloud resource by using the request information.

Figure 3:
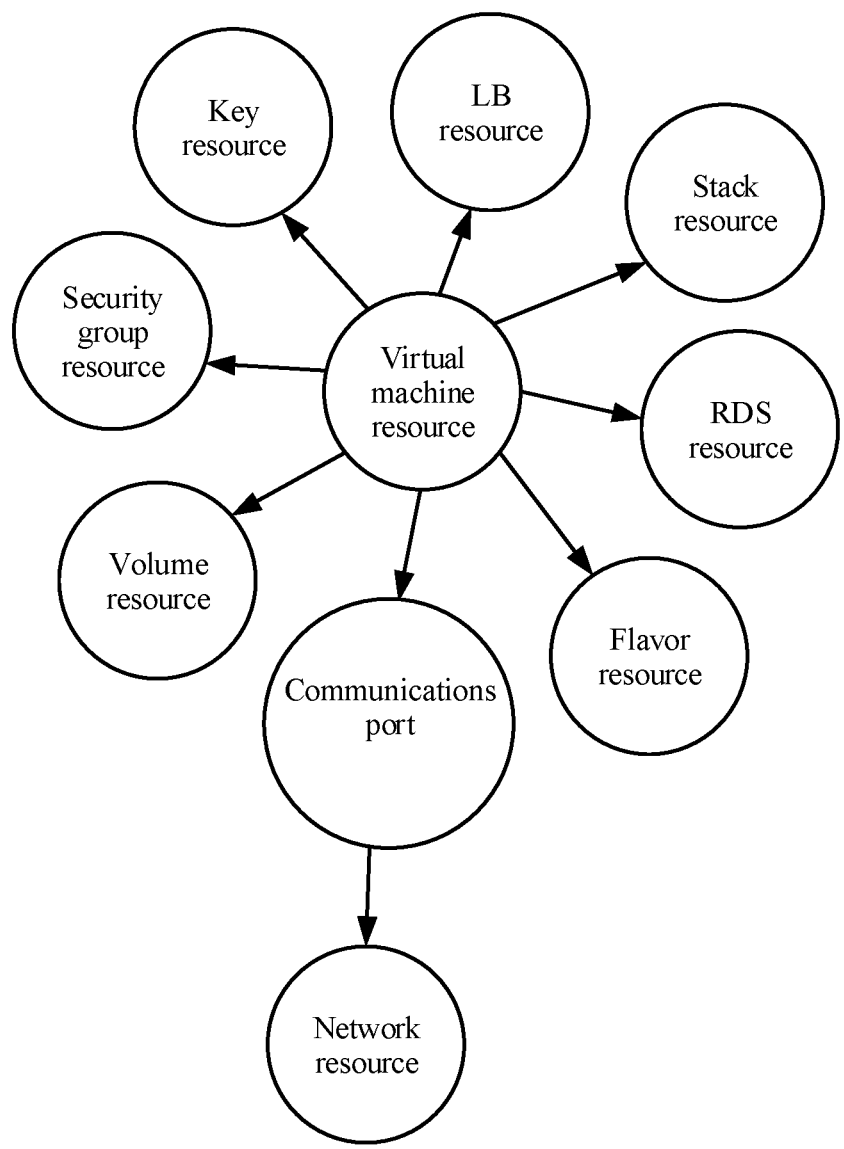
FIG. 3 is a schematic diagram of parsing a virtual machine resource according to an embodiment of the present disclosure.

Optionally, the to-be-processed cloud resource may include one or more virtual machine resources. For example, any virtual machine resource is parsed. Specifically, as shown in FIG. 3, at a first layer, an identifier of each resource associated with the virtual machine resource is first obtained through parsing. The identifier may include a flavor resource ID, a fixed IP address, and a volume ID, and may further include a security group ID, a secret key (key pair) ID, a load balancer (LB) ID, and an image ID. In addition, attribute information of the virtual machine resource may be further obtained through parsing at the first layer. The attribute information may include metadata, and may further include user data.

It should be understood that dependent cloud resources associated with the virtual machine resource may be correspondingly determined based on the foregoing identifiers of the virtual machine resource that are obtained through parsing. For example, it may be determined, based on the volume ID, that the dependent cloud resource of the virtual machine resource includes a volume resource; or it may be determined, based on the fixed IP addresses, that the dependent cloud resource of the virtual machine resource includes a communications port. As shown in FIG. 3, the virtual machine resource in FIG. 3 is the to-be-processed cloud resource, and resources, namely cloud resources represented by circles in FIG. 3 except the virtual machine resource are all dependent cloud resources of the virtual machine resource.

Further, for parsing of the virtual machine resource, at a second layer, resource information of each dependent cloud resource associated with the virtual machine resource may be further obtained through parsing. The resource information group of the virtual machine resource includes the resource information of the dependent cloud resource, and further includes resource information of the to-be-processed cloud resource. For example, the flavor ID obtained at the first layer may continue to be parsed at the second layer to obtain detailed information about a flavor flavor resource, such as information about a central processing unit (CPU) and information about a memory. For another example, a communications port that may be determined to be connected to the virtual machine resource and that is obtained at the first layer may continue to be parsed at the second layer to obtain information such as an ID of the port, MAC, or a subnet ID.

By analogy, a resource corresponding to each piece of resource information obtained at the second layer is further parsed until all information obtained through parsing has no content that needs to be parsed. For example, the attribute information of the virtual machine resource, such as user data, that is obtained at the first layer has no content that needs to continue to be parsed. Therefore, parsing is not performed at the second layer. For another example, the detailed information about the flavor, such as the obtained CPU and memory information, that is obtained through parsing at the second layer has no content that needs to continue to be parsed either. In other words, there is no need to perform parsing at a third layer. For another example, for the information about the port that is obtained by parsing the fixed IP addresses at the second layer, the port is associated with a network resource. In this case, resource information of the network resource needs to continue to be parsed at the third layer, and so on, until the parsed information has no content that needs to be parsed.

The foregoing resource information obtained by parsing the virtual machine resource may be summarized to form the resource information group of the virtual machine resource, and another cloud resource determined by using the virtual machine resource is the dependent cloud resource of the virtual machine resource.

It should be understood that when a user determines that the virtual machine resource needs to be processed, the resource information group of the virtual machine resource needs to include attribute information of the virtual machine resource, and information about dependent cloud resources of the virtual machine resource: a flavor resource, a volume resource, and a network resource. Another dependent cloud resource is an optional resource. For example, a resource such as an LB resource associated with the virtual machine resource or a security group resource is an optional resource, and the user may choose whether to process the optional resource. For a resource that is not processed, a corresponding identifier field may not be parsed, or a corresponding identifier field cannot be obtained through parsing, and the resource information group of the virtual machine resource does not include resource information of the resource.

It should be understood that the foregoing uses an example in which any virtual machine resource is parsed for description. When a plurality of virtual machine resources need to be parsed, each virtual machine resource may be parsed according to the foregoing method to obtain a resource information group of each virtual machine resource. The plurality of virtual machine resources may share another resource. For example, if the plurality of virtual machine resources may be associated with a same volume resource, the same volume resource is parsed, the same volume resource is a dependent cloud resource for the plurality of virtual machine resources, and resource information of the same volume resource belongs to resource information groups of the plurality of virtual machine resources.

It should be understood that an example in which any virtual machine resource is parsed is used in FIG. 3, and the dependent cloud resources related to the virtual machine resource are not the end of parsing. In other words, the dependent cloud resources may be further parsed to obtain resource information of corresponding resources, to jointly form the resource information group of the virtual machine resource.

Figure 4:
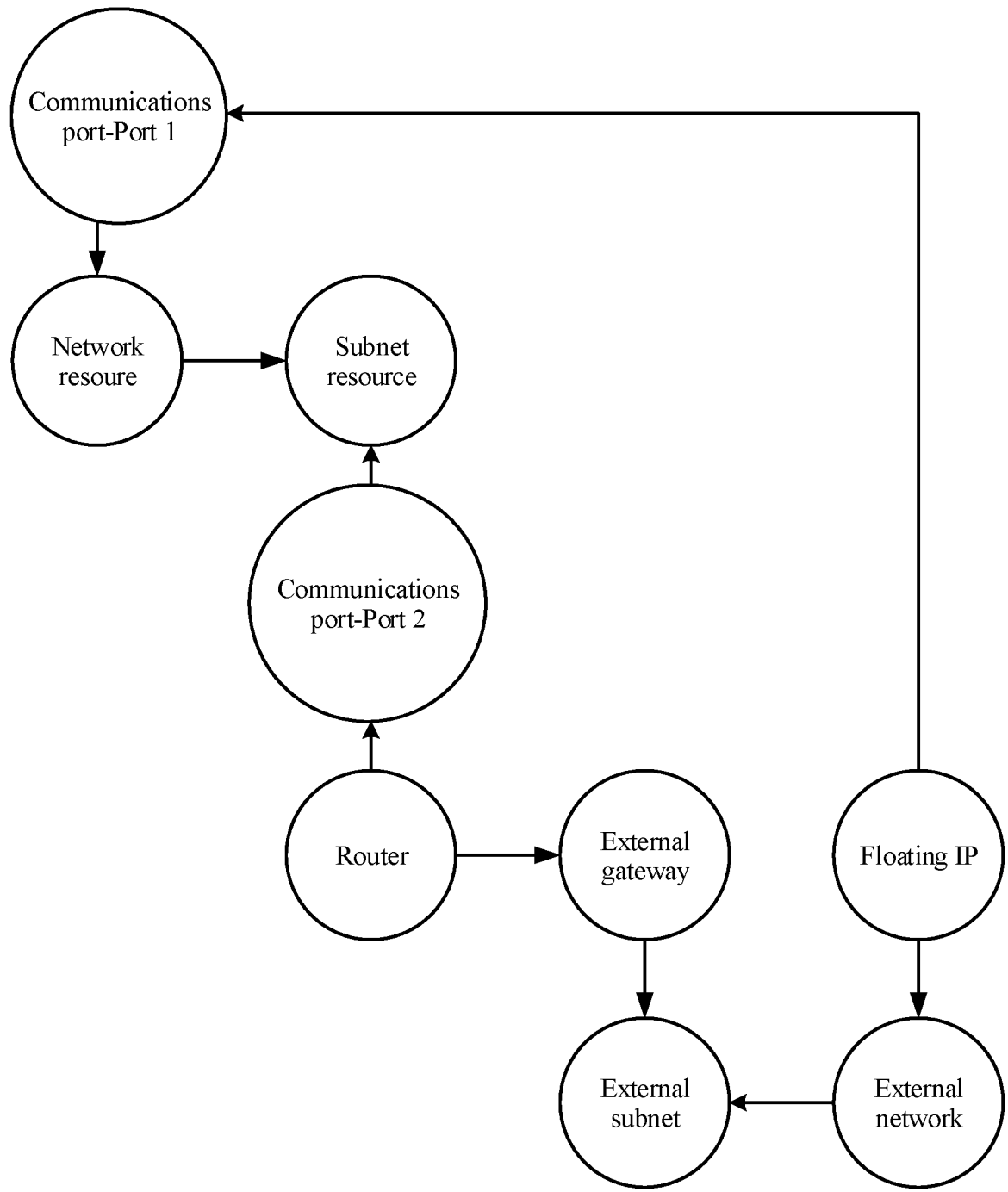
FIG. 4 is a schematic diagram of parsing a network resource according to an embodiment of the present disclosure.

In this embodiment of the present disclosure, the at least one to-be-processed cloud resource may further include one or more network resources. For example, any network resource is parsed. Specifically, as shown in FIG. 4, a network resource in FIG. 4 may be connected to a virtual machine resource by using a communications port (e.g., port 1). To be specific, when the virtual machine resource needs to be cloned or migrated, the network resource is parsed by using the port 1, where the network resource is a dependent cloud resource of the virtual machine resource; and a resource information group of the virtual machine resource is obtained, where the resource information group includes information about the network resource. Optionally, only the network resource may be selected for cloning or migration. In this case, only the network resource needs to be parsed, where the network resource is a to-be-processed cloud resource, and another resource associated with the network resource is a dependent cloud resource of the network resource; and a resource information group of the network resource may be obtained, where the resource information group includes resource information of the dependent cloud resource of the network resource.

Specifically, regardless of whether the network resource is used as the to-be-processed resource or the dependent cloud resource of the virtual machine resource, during parsing of the network resource, detailed information about the network resource is queried, and a subnet subnet ID, a network type, and a physical network that are of the network resource are obtained through parsing at the first layer. A plurality of routers associated with the subnet subnet are found at the second layer. Specifically, all routers in an OpenStack platform are traversed to find all ports in each router, and it is checked whether a subnet associated with each port is a subnet corresponding to the subnet ID obtained through parsing at the first layer. If the subnet associated with the port is the subnet corresponding to the subnet ID obtained through parsing at the first layer, the router is the router associated with the subnet. Each router that is obtained through parsing at the second layer continues to be parsed to obtain detailed information about the router at the third layer. The detailed information about the router may include at least one of: a router name, an available zone, an available zone hint, information indicating whether a distributed manner is used, a route, information indicating whether there is high availability (HA), external gateway information, or the like, and the external gateway information may include an external network ID, information indicating whether to activate source network address translation (SNAT), an external fix ip, and the like. The subnet resource is a dependent resource of the network resource, and the router that is associated with the subnet and that is obtained at the second layer may also be a dependent resource of the network resource.

Optionally, when only the network resource is processed, the network resource is the to-be-processed cloud resource, and it is only required to obtain the detailed information about the router through parsing at the third layer. In other words, the resource information group of the network resource includes the detailed information about the router.

When the virtual machine resource is processed, that is, the resource information group of the virtual machine resource includes information about the network resource, the network resource is the dependent cloud resource of the virtual machine resource, and the information about the network resource is obtained by parsing the network resource, parsing at a fourth layer may be further performed. In other words, external gateway information of each router at the third layer is parsed at the fourth layer to determine a target router from the plurality of routers at the third layer. An external network associated with an external gateway of the target router is a network that provides a floating IP address for the port 1. Specifically, the plurality of routers at the third layer may be parsed one by one until the target router is determined. The target router is a dependent cloud resource of the network resource, and information about the target router belongs to the resource information of the network resource.

The foregoing resource information obtained by parsing the network resource may be summarized to form the resource information group of the network resource. Similarly, another cloud resource determined by using the network resource is a dependent cloud resource of the network resource, and when the network resource is a dependent cloud resource, for example, when the network resource is a dependent cloud resource of a virtual machine, the dependent cloud resource of the network resource is also a dependent cloud resource of the virtual machine, and the resource information group of the network resource also belongs to the resource information group of the virtual machine resource.

It should be understood that when the user determines that the network resource needs to be processed, the resource information group of the network resource includes subnet information of the network resource, and other resource information is optional resource information, for example, both the information about the router determined at the second layer and the information about the target router determined at the fourth layer are optional resource information. Similarly, the subnet is a dependent cloud resource of the network resource, the router determined at the second layer and the target router determined at the fourth layer are optional dependent cloud resources of the network resource, and the user may choose whether to process the optional resources. A resource that is not processed does not belong to the dependent resource of the network resource, and the resource information group of the network resource does not include resource information of the resource.

It should be understood that the foregoing uses an example in which any network resource is parsed for description. When a plurality of network resources need to be parsed, each network resource may be parsed according to the foregoing method to obtain a dependent cloud resource and a resource information group that are of each network resource. The plurality of network resources may share another resource. For example, if the plurality of network resources may be associated with a same subnet subnet, the same associated subnet resource is a dependent cloud resource for the plurality of network resources, and the same subnet is parsed, where resource information of the same subnet belongs to resource information groups of the plurality of network resources.

Figure 5:
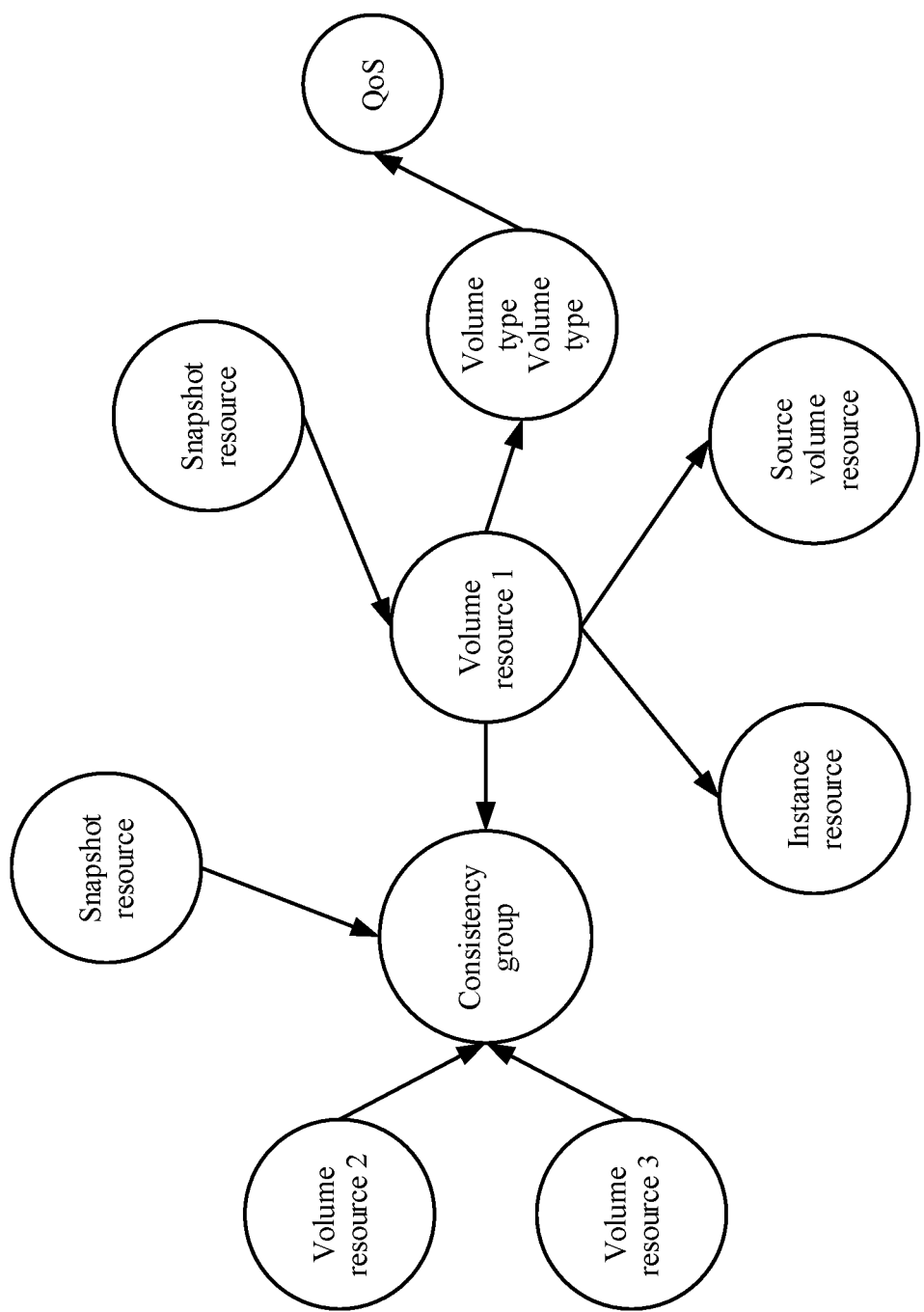
FIG. 5 is a schematic diagram of parsing a volume resource according to an embodiment of the present disclosure.

In this embodiment of the present disclosure, the at least one to-be-processed cloud resource may further include one or more volume resources. For example, any volume resource is parsed. Similarly, the volume resource may be a to-be-processed cloud resource, that is, the volume resource is cloned or migrated; or the volume resource may be a dependent cloud resource of another to-be-processed cloud resource, for example, a dependent cloud resource of a virtual machine resource. Specifically, as shown in FIG. 5, a volume resource 1 in FIG. 5 is a to-be-processed volume resource, and a dependent cloud resource and a resource information group that are of the volume resource are determined. A size of the volume 1, a snapshot ID, a source volume ID, a volume type ID, a consistency group ID, mount information, and the like are obtained through parsing at a first layer. The mount information includes one or more mounted instance IDs. At a second layer, snapshot information, source volume information, and volume type information continue to be obtained through parsing, and all volume resources are traversed to obtain another volume in the same consistency group as the volume 1, such as a volume 2 and a volume 3 in FIG. 5. At a third layer, a snapshot of a consistency group is obtained, and all pieces of quality of service (QoS) are traversed to find QoS information associated with a volume type of the volume 1; and information about the QoS continues to be obtained through parsing at a fourth layer.

The foregoing resource information obtained by parsing the volume resource may be summarized to form the resource information group of the volume resource, and resources in FIG. 5 other than volume resources form dependent cloud resources of the volume resource. Similarly, another cloud resource determined by using the volume resource is a dependent cloud resource of the volume resource, and when the volume resource is a dependent cloud resource, for example, when the volume resource is a dependent cloud resource of a virtual machine, the dependent cloud resource of the volume resource is also a dependent cloud resource of the virtual machine, and the resource information group of the volume resource also belongs to the resource information group of the virtual machine resource.

It should be understood that when the user determines that the volume resource needs to be processed, the resource information group of the volume resource includes information that indicates the size of the volume resource, and other resource information is optional resource information, for example, volume type information, source volume resource information, and the like are optional resource information. For example, the resources in FIG. 5 other than the volume resources form the dependent cloud resources of the volume resource. These dependent cloud resources are optional resources, and the user may choose whether to process the optional resources. A resource that is not processed does not belong to the dependent cloud resource of the volume resource, and the resource information group of the volume resource does not include resource information of the resource.

It should be understood that the foregoing uses an example in which any volume resource is parsed for description. When a plurality of volume resources need to be parsed, each volume resource may be parsed according to the foregoing method to obtain a dependent cloud resource and a resource information group that are of each volume resource. The plurality of volume resources may share another resource. For example, if the plurality of volume resources may be associated with a same consistency group, the same consistency group resource is a dependent cloud resource for the plurality of volume resources, and information about the same consistency group is parsed, where resource information of the same consistency group belongs to resource information groups of the plurality of volume resources.

Figure 6:
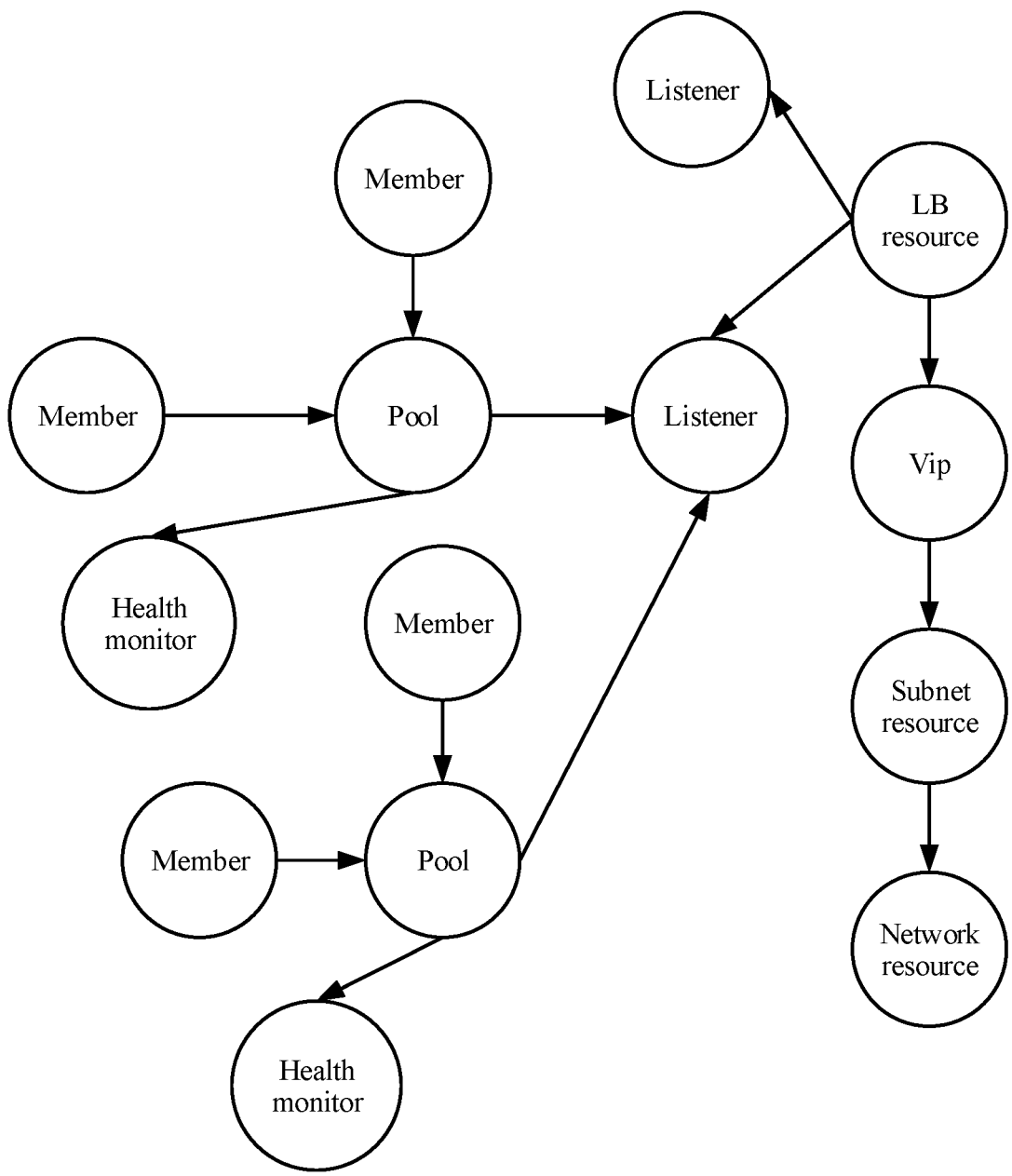
FIG. 6 is a schematic diagram of parsing an LB resource according to an embodiment of the present disclosure.

In this embodiment of the present disclosure, the at least one to-be-processed cloud resource may further include one or more load balancer (LB) resources. For example, any LB resource is parsed. Similarly, the LB resource may be a to-be-processed cloud resource, that is, the LB resource is cloned or migrated; or the LB resource may be a dependent cloud resource of another to-be-processed cloud resource, for example, a dependent cloud resource of a virtual machine resource. Specifically, as shown in FIG. 6, detailed information about an LB resource in FIG. 6 is parsed at a first layer to obtain information about a flavor of the LB resource, information about a provider, information about a virtual IP (VIP), and information about a subnet of the VIP. At a second layer, a status tree of the LB resource is queried to find all listeners of the LB resource, all pools in each listener, all members in each pool, and a health monitor. Specifically, detailed information about each listener, detailed information about a pool, detailed information about a member, and detailed information about the health monitor are obtained, and attribute information of the listener, attribute information of the pool, attribute information of the member, and attribute information of the health monitor are obtained through parsing. The attribute information of the listener includes a connection upper limit, description information of the listener, a protocol, a port, a Transport Layer Security (TLS) Protocol key container, and a TLS key list. The attribute information of the pool includes description information of the pool, an algorithm of the LB resource, a protocol, and the like. The attribute information of the member includes an IP address of each member. The attribute information of the health monitor includes a detection protocol type, an interval delay, an expiration time, a maximum quantity of times of retries, an HTTP method, a URL, and an expected return code.

The foregoing resource information obtained by parsing the LB resource may be summarized to form a resource information group of the LB resource, and resources in FIG. 6 other than the LB resource form dependent cloud resources of the LB resource. Similarly, another cloud resource determined by using the LB resource is a dependent cloud resource of the LB resource, and when the LB resource is a dependent cloud resource, for example, when the LB resource is a dependent cloud resource of a virtual machine, the dependent cloud resource of the LB resource is also a dependent cloud resource of the virtual machine, and the resource information group of the LB resource also belongs to the resource information group of the virtual machine resource.

It should be understood that as shown in FIG. 6, when the user determines that the LB resource needs to be processed, a resource in FIG. 6 other than the LB resource forms the dependent cloud resource of the LB resource, and the resource information group of the LB resource includes resource information of each dependent cloud resource of the LB and attribute information of the LB resource.

It should be understood that the foregoing uses an example in which any LB resource is parsed for description. When a plurality of LB resources need to be parsed, each LB resource may be parsed according to the foregoing method to obtain a dependent cloud resource and a resource information group that are of each LB resource. The plurality of LB resources may share another resource. For example, if the plurality of LB sources may share a same listener, the shared resource is a dependent cloud resource for the plurality of LB resources, and resource information of the same listener is parsed, where the resource information of the same listener belongs to resource information groups of the plurality of LB resources.

Figure 7:
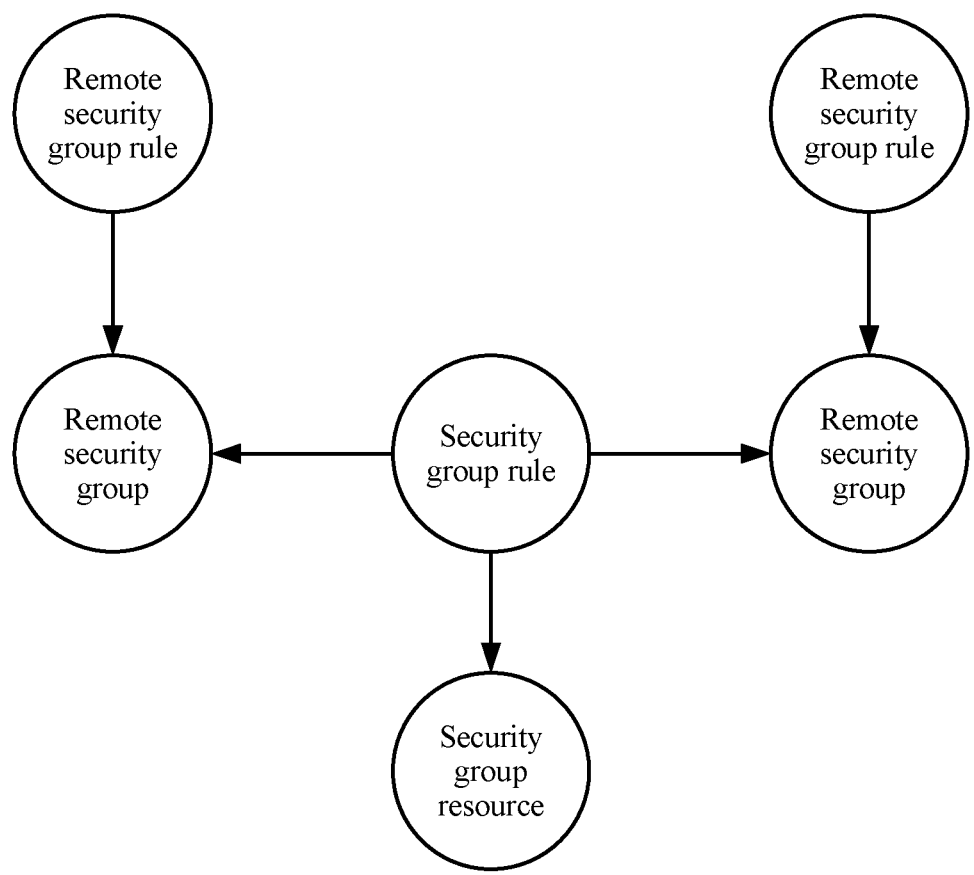
FIG. 7 is a schematic diagram of parsing a security group resource according to an embodiment of the present disclosure.

In this embodiment of the present disclosure, the at least one to-be-processed cloud resource may further include one or more security group resources. For example, any security group resource is parsed. Similarly, the security group resource may be a to-be-processed cloud resource, that is, the security group resource is cloned or migrated; or the security group resource may be a dependent cloud resource of another to-be-processed cloud resource, for example, a dependent cloud resource of a virtual machine resource. Specifically, as shown in FIG. 7, at a first layer, detailed information about a security group resource in FIG. 7, including a security group name, description information, and a security group rule list, is parsed. At a second layer, each security group rule in the security group rule list, including a direction, an Ethernet type, maximum and minimum port range values, a protocol type, a remote security group ID, and an IP prefix continues to be obtained through parsing. The Ethernet type may include IPv4 or IPv6; and the protocol type may include the Transmission Control Protocol (TCP), the User Datagram Protocol (UDP), the Internet Control Message Protocol (ICMP), the Internet Control Message Protocol version 6 (ICMPv6), null null, and the like. A remote security group rule indicated by the remote security group ID is obtained through parsing at a third layer. By analogy, the remote security group rule is parsed to search for a remote security group until there is no remote security group ID.

The foregoing resource information obtained by parsing the security group resource may be summarized to form a resource information group of the security group resource, and resources in FIG. 7 other than the security group resource form dependent cloud resources of the security group resource. Similarly, another cloud resource determined by using the security group resource is a dependent cloud resource of the security group resource, and when the security group resource is a dependent cloud resource, for example, when the security group resource is a dependent cloud resource of a virtual machine, the dependent cloud resource of the security group resource is also a dependent cloud resource of the virtual machine, and the resource information group of the security group resource also belongs to the resource information group of the virtual machine resource.

It should be understood that when the user determines that the security group resource needs to be processed, the dependent cloud resource of the security group resource includes a security group rule of the security group, and another resource is an optional dependent cloud resource. Correspondingly, information about the security group rule belongs to the resource information group of the security group resource, and other cloud resource information is optional information in the resource information group of the security group resource. For example, both a remote security group determined in the security group rule and a security group rule of the remote security group are optional resources, and the user may choose whether to process the optional resources. A resource that is not processed does not belong to the dependent cloud resource of the security group resource, and the resource information group of the security group resource does not include resource information of the resource.

It should be understood that the foregoing uses an example in which any security group resource is parsed for description. When a plurality of security group resources need to be parsed, each security group resource may be parsed according to the foregoing method to obtain a dependent cloud resource and a resource information group that are of each security group resource. The plurality of security group resources may share another resource. For example, if the plurality of security group resources may be associated with a same remote security group, the same remote security group resource belongs to dependent cloud resources of the plurality of security group resources, and resource information of the same remote security group is parsed, where the resource information of the same remote security group belongs to resource information groups of the plurality of security group resources.

Figure 8:
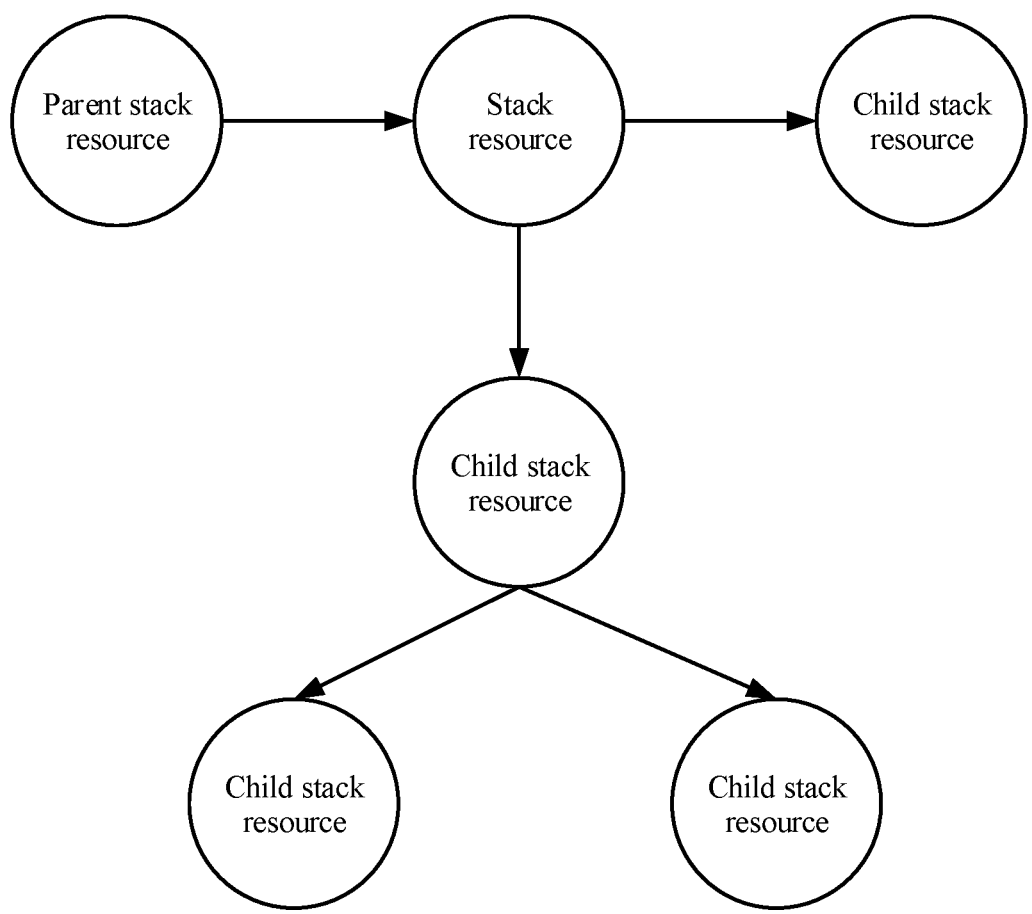
FIG. 8 is a schematic diagram of parsing a stack resource according to an embodiment of the present disclosure.

In this embodiment of the present disclosure, the at least one to-be-processed cloud resource may further include one or more stack resources. For example, any stack resource is parsed. Similarly, the stack resource may be a to-be-processed cloud resource, that is, the stack resource is cloned or migrated; or the stack resource may be a dependent cloud resource of another to-be-processed cloud resource, for example, a dependent cloud resource of a virtual machine resource. Specifically, as shown in FIG. 8, detailed information about a stack resource in FIG. 8 is parsed at a first layer to obtain a capability of a stack, description information, a parameter, a stack name, description information of a template of the stack, parent stack information, a tag, a stack creation expiration time, and information indicating whether to roll back. At a second layer, detailed information about a parent stack of the stack is obtained through parsing, and then a parent stack of the parent stack of the stack is viewed until a stack without a parent stack is found. A third layer searches for and parses information about a child stack of the stack. Specifically, all pieces of stack information in the OpenStack are obtained, and parent stack information of each stack is viewed to determine whether the parent stack is a stack at the first layer. If the parent stack is the stack at the first layer, for example, if it is found that a parent stack of a target stack in the OpenStack is the stack at the first layer, the target stack is a child stack of the stack at the first layer. Then, a resource type of the target stack is viewed to check whether the resource type is a file:/ carried in a template of the parent stack. If the resource type is the file:/ carried in the template of the parent stack, the target stack may be added to a resource topology template of the stack, and resource information of the target stack belongs to a resource information group of the stack resource. If the resource type is not the file:/ carried in the template of the parent stack, the target stack is not added to a resource topology template. Similarly, parent stack information of each stack continues to be traversed at a fourth layer to determine a child stack of the target stack at the third layer. Specifically, the parent stack information of each stack is still traversed to check whether a parent stack of the stack is the target stack determined at the third layer. If the parent stack of the stack is the target stack determined at the third layer, the stack is the child stack of the target stack. Then, a resource type of the stack is viewed to check whether the resource type is a file:/ carried in the parent stack of the stack. If the resource type is the file:/ carried in the parent stack of the stack, the stack may be added to a resource topology template. If the resource type is not the file:/ carried in the parent stack of the stack, the stack is not added to a resource topology template. By analogy, at a fifth layer, all stacks continue to be traversed to check whether a parent stack is a child stack found at a previous layer until the parent stack is not the child stack at the previous layer.

Finally, a template of each found stack is obtained, a template of a child stack that is of the stack at the first layer and that is found at each layer is named as a file name in the resource type, and a template of a complete stack is generated.

The foregoing resource information obtained by parsing the stack resource may be summarized to form the resource information group of the stack resource, and resources in FIG. 8 other than the stack resource form dependent cloud resources of the stack resource. Similarly, another cloud resource determined by using the stack resource is a dependent cloud resource of the stack resource, and when the stack resource is a dependent cloud resource, for example, when the stack resource is a dependent cloud resource of a virtual machine, the dependent cloud resource of the stack resource is also a dependent cloud resource of the virtual machine, and the resource information group of the stack resource also belongs to the resource information group of the virtual machine resource.

It should be understood that when the user determines that the stack resource needs to be processed, the resource information group of the stack resource includes related attribute information of the stack, and other resource information is an optional resource. For example, a child stack, a parent stack, and the like that are of the stack are optional resources, and the user may choose whether to process the optional resources. A resource that is not processed does not belong to the dependent cloud resource of the stack resource, and the resource information group of the stack resource does not include resource information of the resource, for example, may not include information about a child stack resource or information about a parent stack resource.

It should be understood that the foregoing uses an example in which any stack resource is parsed for description. When a plurality of stack resources need to be parsed, each stack resource may be parsed according to the foregoing method to obtain a dependent cloud resource and a resource information group that are of each stack resource. The plurality of stack resources may share another resource. For example, if the plurality of stack sources may belong to a same parent stack, the parent stack resource is a dependent cloud resource for the plurality of stack resources, and resource information of the same parent stack is parsed, where the resource information of the same parent stack belongs to resource information groups of the plurality of stack resources.

Figure 9:
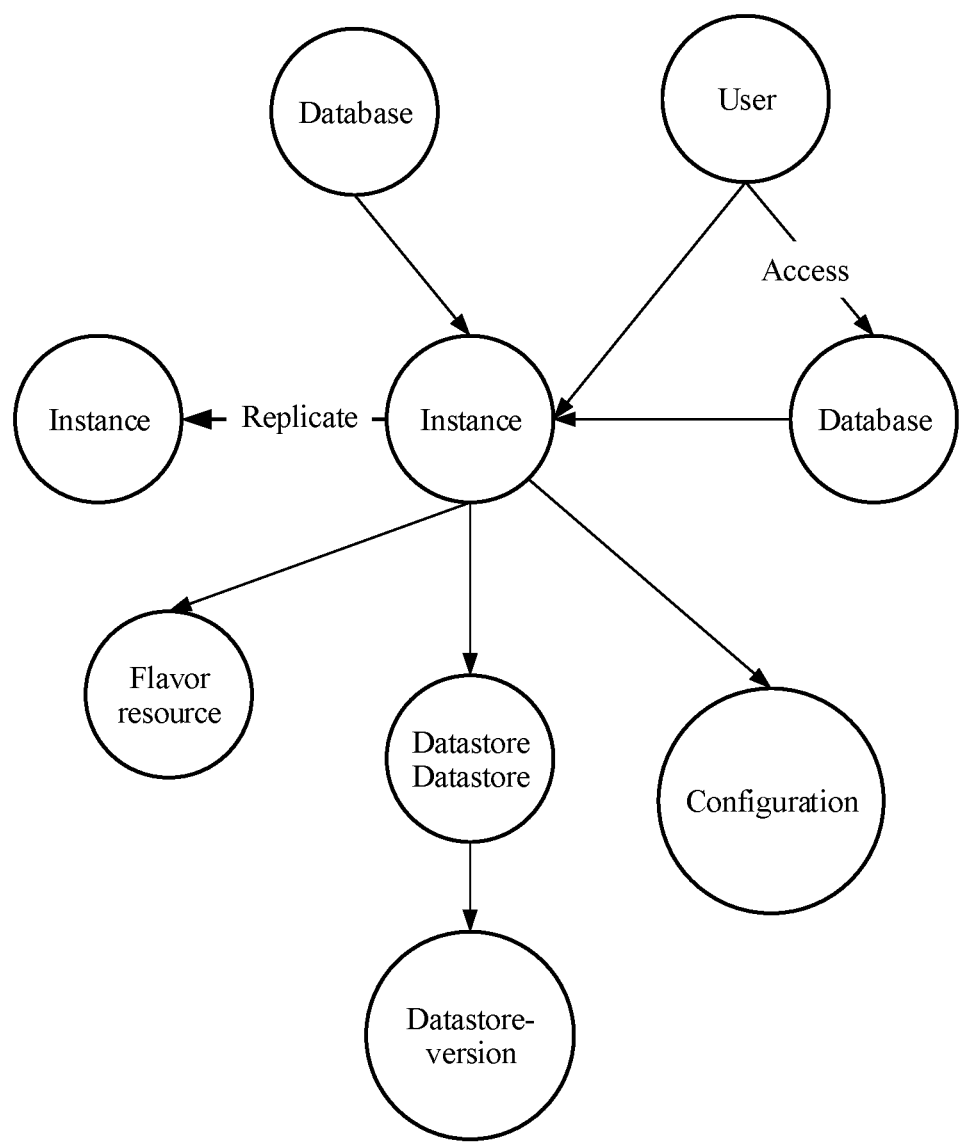
FIG. 9 is a schematic diagram of parsing a cloud service resource according to an embodiment of the present disclosure.

In this embodiment of the present disclosure, the at least one to-be-processed cloud resource may further include one or more cloud service resources, for example, a cloud service herein is an RDS, and any RDS resource is parsed. Similarly, the RDS resource may be a to-be-processed cloud resource, that is, the RDS resource is cloned or migrated; or the RDS resource may be a dependent cloud resource of another to-be-processed cloud resource, for example, a dependent cloud resource of a virtual machine resource. Specifically, as shown in FIG. 9, detailed information about an instance resource in FIG. 9 is parsed at a first layer to obtain a name of an instance, a flavor, volume information, an available zone, a network, configuration information, datastore, datastore-version information, and information about a source instance. The instance is an instance served by the RDS, the volume information includes a volume size and a volume type, and the instance is replicated from the source instance. At a second layer, detailed information about the flavor continues to be viewed, and detailed information about a configuration group is viewed to obtain a name of the configuration group, a configuration parameter name and value, datastore, datastore-version information, description information, and the like through parsing; and all pieces of database information of the instance also needs to be viewed to obtain a database name, a character set, and a character comparison rule in a proofreading character set through parsing. All pieces of user information of the instance are parsed at a third layer to obtain database information that can be accessed by each user, but a password of each user cannot be obtained. The information about the source instance continues to be parsed at a fourth layer to obtain information about another instance associated with the source instance.

The foregoing resource information obtained by parsing the instance resource may be summarized to form a resource information group of the instance resource, and resources in FIG. 9 other than the instance resource form dependent cloud resources of the instance resource. Similarly, another cloud resource determined by using the instance resource is a dependent cloud resource of the instance resource, and when the instance resource is a dependent cloud resource, for example, when the instance resource is a dependent cloud resource of a virtual machine, the dependent cloud resource of the instance resource is also a dependent cloud resource of the virtual machine, and the resource information group of the instance resource also belongs to the resource information group of the virtual machine resource.

It should be understood that when the user determines that the cloud service resource such as the instance resource needs to be processed, the resource information group of the instance resource includes information other than information about the source instance, a source instance resource is an optional resource, and the user may choose whether to process the optional resource. A source instance resource that is not processed does not belong to the dependent cloud resource of the instance resource, and the resource information group of the instance resource does not include resource information of the source instance resource.

It should be understood that the foregoing uses an example in which any cloud service resource is parsed for description. When a plurality of cloud service resources need to be parsed, each cloud service resource may be parsed according to the foregoing method to obtain a resource information group of each cloud service resource. The plurality of cloud service resources may share another resource. For example, if a plurality of instance resources may be replicated from a same source instance, the source resource is a dependent cloud resource for the plurality of instances, and resource information of the same source instance is parsed, where the resource information of the same source instance belongs to resource information groups of the plurality of instance resources.

It should be understood that each cloud resource that is associated with the virtual machine resource and that is shown in FIG. 3 may be used as the to-be-processed cloud resource determined in S110 for separate cloning or migration, and the resource information group of the virtual machine resource includes resource information of each cloud resource that is associated with the virtual machine resource and that is in FIG. 3. The dependent cloud resources of the virtual machine resource may include resources in FIG. 3 other than the virtual machine resource, and resource information of each dependent cloud resource may be obtained according to parsing processes in FIG. 4 to FIG. 9. In addition, when each to-be-processed cloud resource determined in S110 is separately cloned or migrated, a resource information group of each cloud resource may be obtained according to the parsing processes in FIG. 4 to FIG. 9.

It should be understood that a resource node represented by each circle shown in FIG. 3 to FIG. 9 may be cloned or migrated. For example, for the security group resource in FIG. 3, when the virtual machine resource is processed, the security group resource may be cloned or migrated at the same time, or the security group resource may be cloned or migrated. Specifically, as shown in FIG. 7, the resource information group of the security group resource may be obtained through parsing, and then is processed. For another example, for the volume type in FIG. 5, when the volume resource is processed, the volume type may be processed at the same time, and the volume type may be separately used as a cloud resource for separate cloning or migration, that is, a volume resource type is cloned or migrated. Specifically, the volume type may be parsed to obtain resource information of the volume type, and further processing is performed based on the resource information.

S130. Generate a resource topology template, where the resource topology template includes the resource information group of the to-be-processed cloud resource and a dependency relationship between the to-be-processed cloud resource and the dependent cloud resource.

In this embodiment of the present disclosure, for the resource information group and the dependent cloud resource that are of each to-be-processed cloud resource and that are determined in S120, the resource topology template may be generated based on a dependency relationship between dependent cloud resources and/or a dependency relationship between to-be-processed cloud resources. The resource topology template includes resource information of various cloud resources. Specifically, the resource topology template may indicate a dependency relationship between cloud resources and resource information of each cloud resource. For example, FIG. 3 to FIG. 9 each may be a resource topology template, or a part of a resource topology template. In FIG. 3 to FIG. 9, a dependency relationship is indicated by using an arrow tail between the cloud resources. For example, as shown in FIG. 3, a virtual machine resource is parsed in a process of cloning or migrating the virtual machine resource, and resource information of a volume resource is parsed for an obtained volume ID. Therefore, a dependency relationship is indicated by using an arrow, in FIG. 3, that points from the virtual machine resource to the volume resource. For another example, as shown in FIG. 4, in a process of parsing a network resource, a router associated with a subnet subnet resource is searched for, and the router associated with the subnet may be determined by searching for a communications port of the router. Therefore, a dependency relationship among the router, the communications port, and the subnet resource is indicated in the resource topology template by using arrows, where one arrow points from the router to the communications port, and the other arrow points from the communications port to the subnet.

It should be understood that when a plurality of cloud resources are cloned or migrated, a part of the resource topology template may be generated for each cloud resource. Because there may be a shared dependent cloud resource for the plurality of cloud resources, the resource topology template may indicate a dependency relationship between the plurality of cloud resources. If there is no dependency relationship between the plurality of cloud resources, and there is no shared resource, a resource topology template of each resource may be generated, the resource topology templates of all the resources may be integrated into one resource topology template, and there is no dependency relationship between the cloud resources indicated by each part of the resource topology template.

S140. Clone or migrate the to-be-processed cloud resource based on the resource topology template.

It should be understood that for the generated resource topology template, the user may modify, or add or delete a cloud resource or resource information of a cloud resource in the generated resource topology template, for example, change a subnet and a net that are of a port. In addition, for cloning or migration between different clouds, the user may modify a cloud resource into a resource in a destination cloud, for example, find a corresponding flavor in the destination cloud based on information such as a detailed CPU and memory of a flavor, and modify a net, a subnet, and a security group into corresponding resources in the destination cloud.

Optionally, for clone processing of the cloud resource, the at least one to-be-processed cloud resource in S110 and the dependent cloud resource and the resource information group that are of the to-be-processed cloud resource need to be replicated. Specifically, there may be a plurality of clone methods. For example, in a process of cloning at least one cloud resource, a clone task flow may be reversely generated based on a resource topology relationship between cloud resources, and each cloud resource is cloned based on a task flow. This method supports clone processing of a cloud resource in a cloud. For another example, a resource topology template determined by parsing cloud resources may be further generated, and the cloud resources are deployed based on the resource topology template to complete cloning of each cloud resource. When the cloud resources are deployed, the resource topology template is parsed to generate a reverse clone task, and each cloud resource is cloned based on a task flow. This method supports cloud resource cloning in a cloud and cloud resource cloning between different clouds.

As shown in FIG. 1, during cloud resource cloning between the different clouds, a clone node of a source cloud generates a resource topology template, and derives the resource topology template from the source cloud, for example, derives the resource topology template by using a gateway of the clone node, and then sends the resource topology template to a destination cloud. A physical node in the destination node receives the resource topology template, for example, the physical node receives the resource topology template by using the gateway, and performs clone processing based on the resource topology template. The physical node may be referred to as a clone node. Specifically, the clone node in the destination cloud generates a clone task flow based on the resource topology template, and deploys the cloud resource to complete clone processing of the cloud resource in the destination cloud.

In this embodiment of the present disclosure, after cloud resource cloning performed on a cloud resource such as a virtual machine resource or a volume resource is completed, data cloning needs to be performed, and the data cloning can be completed by invoking an agent such as a gateway located in the cloud resource. Optionally, there may be two types of data cloning processes: One type is cold migration. To be specific, if cloning is performed when the cloud resource is offline, replication of data in each volume needs to be completed. The other type is hot migration. To be specific, if online cloning may be performed on the cloud resource, replication of historical data in each volume is completed, replication of incremental data in each volume is performed, and then replication of temporary data such as memory is performed.

In this embodiment of the present disclosure, for clone processing of a virtual machine resource, a destination virtual machine resource is obtained by using a source virtual machine resource through cloning. Before the data cloning, the agent obtains a file system formatting manner and a mount path of each volume on the source virtual machine resource, and sends the file system formatting manner and the mount path to a destination virtual machine, so that source and destination virtual machine directory structures remain consistent.

Specifically, a specific implementation method of data cloning may include: One is to traverse a directory mounted in a volume, and successively transmit each layer directory and each file; and the other is to directly read each block data from a device, and transmit each block data to a destination end.

Optionally, there may be the following three types of migration processing of a cloud resource:

1. After migration is completed, a cloud resource ID remains unchanged, and a resource attribute also remains unchanged. This method is merely for migration processing of a cloud resource in a same cloud.

Specifically, similar to cloning in the same cloud in the foregoing clone processing process, a migration task flow is reversely generated based on a resource topology template obtained through parsing, and each cloud resource is migrated based on a task flow. Each cloud resource may be migrated by directly invoking a cloud resource migration method currently provided in the OpenStack.

Optionally, after migration of the cloud resource and data is completed, the cloud resource ID is refreshed. A virtual machine resource is used as an example. After the virtual machine resource and the data are replicated, a source virtual machine resource is deleted, a port is recreated by using a MAC address and a fixed IP address of a source virtual machine port, the port is mounted to a migrated destination virtual machine, and a destination virtual machine ID is refreshed to a source virtual machine ID.

2. After migration, a cloud resource ID changes, but a resource attribute remains unchanged.

Optionally, for example, a virtual machine resource is migrated. After the virtual machine resource and data are replicated, a source virtual machine is deleted, a port is recreated by using a MAC address and a fixed IP address of a source virtual machine port, and the port is mounted to a destination end virtual machine.

3. After migration, a cloud resource ID changes, and a resource attribute may also change.

Optionally, for example, a virtual machine resource is migrated. After the resource and data are replicated, a source virtual machine is directly deleted.

Optionally, the user may set whether to change the cloud resource ID and the resource attribute.

It should be understood that sequence numbers of the foregoing processes do not mean execution sequences in the embodiments of the present disclosure. The execution sequences of the processes should be determined according to functions and internal logic of the processes, and should not be construed as any limitation on the implementation processes of the embodiments of the present disclosure.

Therefore, according to the cloud resource processing method in this embodiment of the present disclosure, the dependent cloud resource of the to-be-processed cloud resource and the resource information group of the to-be-processed cloud resource are obtained; the resource topology template that can indicate the dependency relationship between the to-be-processed cloud resource and the dependent cloud resource is determined based on the dependent cloud resource and the resource information group that are of the to-be-processed cloud resource; and the to-be-processed cloud resource may be cloned or migrated based on the resource topology template, so that a plurality of cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

Figure 10:
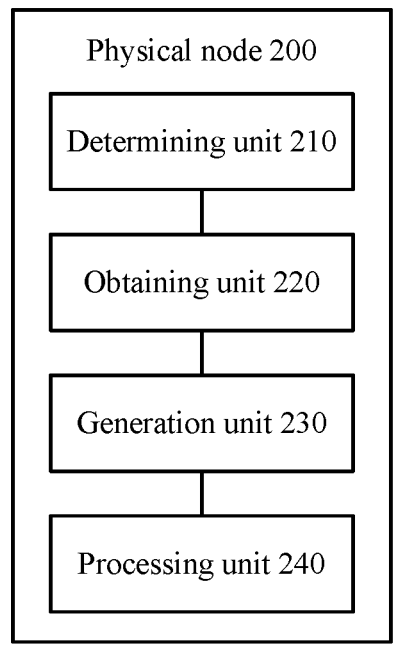
FIG. 10 is a schematic block diagram of a physical node according to an embodiment of the present disclosure.
Figure 11:
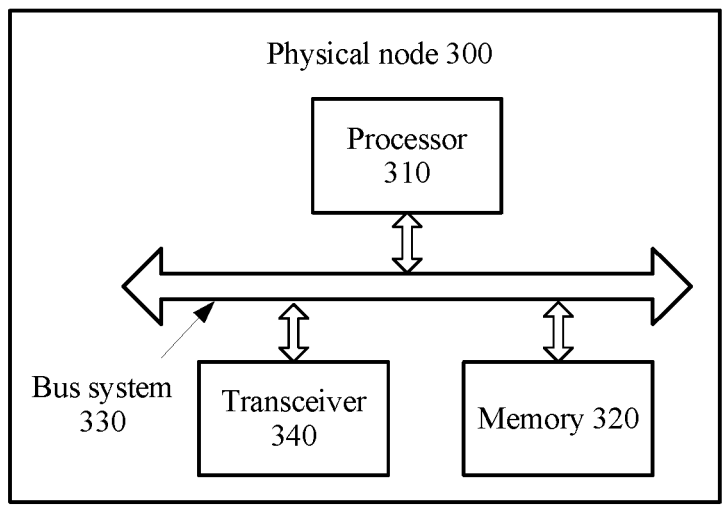
FIG. 11 is a schematic block diagram of a physical node according to another embodiment of the present disclosure.

The foregoing describes in detail the cloud resource processing method according to the embodiments of the present disclosure with reference to FIG. 1 to FIG. 9, and the following describes cloud resource processing physical nodes according to embodiments of the present disclosure with reference to FIG. 10 and FIG. 11.

As shown in FIG. 10, a physical node 200 according to an embodiment of the present disclosure includes:

a determining unit 210, configured to determine a to-be-processed cloud resource;

an obtaining unit 220, configured to obtain a dependent cloud resource of the to-be-processed cloud resource and a resource information group of the to-be-processed cloud resource, where the resource information group includes resource information of the dependent cloud resource;

a generation unit 230, configured to generate a resource topology template, where the resource topology template includes the resource information group of the to-be-processed cloud resource and a dependency relationship between the to-be-processed cloud resource and the dependent cloud resource; and a processing unit 240, configured to clone or migrate the to-be-processed cloud resource based on the resource topology template.

Therefore, the physical node in this embodiment of the present disclosure obtains the dependent cloud resource of the to-be-processed cloud resource and the resource information group of the to-be-processed cloud resource; generates the resource topology template that includes the resource information group of the to-be-processed cloud resource, where the resource topology template can indicate the dependency relationship between the to-be-processed cloud resource and the dependent cloud resource; and may clone or migrate the to-be-processed cloud resource based on the resource topology template, so that one or more cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

Optionally, the resource information group includes resource information of the to-be-processed cloud resource. The to-be-processed cloud resource is a virtual machine resource. A dependent cloud resource of the virtual machine resource includes a flavor resource, a volume resource, and a network resource. A resource information group of the virtual machine resource includes attribute information of the virtual machine resource, information about the flavor resource, information about the volume resource, and information about the network resource.

Optionally, the to-be-processed cloud resource is a network resource. A dependent cloud resource of the network resource includes a subnet resource of the network resource. A resource information group of the virtual machine resource includes information about the subnet resource.

Optionally, the obtaining unit 220 is specifically configured to: determine, based on the information about the subnet resource, at least one router associated with the subnet resource, where the dependent cloud resource of the network resource includes the at least one router; and obtain information about each of the at least one router, where the resource information group of the network resource includes the information about each router.

Optionally, the obtaining unit 220 is specifically configured to: determine, based on the information about the subnet resource, at least one router associated with the subnet; obtain extranet information of each of the at least one router; and based on the extranet information of each router, determine a target router from the plurality of routers and obtain information about the target router, where an extranet associated with the target router and a floating IP address of a port of a virtual machine resource are in a same network, the dependent cloud resource of the network resource includes the target router, and the resource information group of the network resource includes the information about the target router.

Optionally, the resource information group includes resource information of the to-be-processed cloud resource; the to-be-processed cloud resource is a volume resource; and a resource information group of the volume resource includes a size of the volume resource.

Optionally, the to-be-processed cloud resource is located in a source cloud, and the processing unit 240 is specifically configured to send the resource topology template to a destination cloud, to clone or migrate, in the destination cloud, the to-be-processed cloud resource in the source cloud based on the resource topology template.

It should be understood that the physical node 200 according to this embodiment of the present disclosure may correspondingly perform the method 100 in this embodiment of the present disclosure, and may be corresponding to the physical node that performs cloning or migration in the source cloud in FIG. 1, namely, the clone node in FIG. 1. In addition, the foregoing and other operations and/or functions of the units of the physical node 200 are respectively intended to implement corresponding procedures of the methods in FIG. 1 to FIG. 9. For brevity, details are not described herein again.

Therefore, the physical node in this embodiment of the present disclosure obtains the dependent cloud resource of the to-be-processed cloud resource and the resource information group of the to-be-processed cloud resource; generates the resource topology template that includes the resource information group of the to-be-processed cloud resource, where the resource topology template can indicate the dependency relationship between the to-be-processed cloud resource and the dependent cloud resource; and may clone or migrate the to-be-processed cloud resource based on the resource topology template, so that a plurality of cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

FIG. 11 is a schematic block diagram of a physical node 300 according to an embodiment of the present disclosure. As shown in FIG. 11, the physical node 300 includes a processor 310. Optionally, the physical node 300 further includes a memory 320, and the memory 320 is connected to the processor 310. Optionally, the physical node 300 further includes a bus system 330. The processor 310 and the memory 320 may be connected by using the bus system 330, the memory 320 may be configured to store an instruction, and the processor 310 is configured to execute the instruction stored in the memory 320. The processor 310 is specifically configured to: determine a to-be-processed cloud resource; obtain a dependent cloud resource of the to-be-processed cloud resource and a resource information group of the to-be-processed cloud resource, where the resource information group includes resource information of the dependent cloud resource; determine a resource topology template based on the resource information group and the dependent cloud resource that are of the to-be-processed cloud resource, where the resource topology template indicates a dependency relationship between the to-be-processed cloud resource and the dependent cloud resource; and clone or migrate the to-be-processed cloud resource based on the resource topology template.

Therefore, the physical node in this embodiment of the present disclosure obtains the dependent cloud resource of the to-be-processed cloud resource and the resource information group of the to-be-processed cloud resource; generates the resource topology template that includes the resource information group of the to-be-processed cloud resource, where the resource topology template can indicate the dependency relationship between the to-be-processed cloud resource and the dependent cloud resource; and may clone or migrate the to-be-processed cloud resource based on the resource topology template, so that a plurality of cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

Optionally, the resource information group includes resource information of the to-be-processed cloud resource. The to-be-processed cloud resource is a virtual machine resource. A dependent cloud resource of the virtual machine resource includes a flavor resource, a volume resource, and a network resource. A resource information group of the virtual machine resource includes attribute information of the virtual machine resource, information about the flavor resource, information about the volume resource, and information about the network resource.

Optionally, the to-be-processed cloud resource is a network resource. A dependent cloud resource of the network resource includes a subnet resource of the network resource. A resource information group of the virtual machine resource includes information about the subnet resource.

Optionally, the processor 310 is specifically configured to: determine, based on the information about the subnet resource, at least one router associated with the subnet resource, where the dependent cloud resource of the network resource includes the at least one router; and obtain information about each of the at least one router, where the resource information group of the network resource includes the information about each router.

Optionally, the processor 310 is configured to: determine, based on the information about the subnet resource, at least one router associated with the subnet; obtain extranet information of each of the at least one router; and based on the extranet information of each router, determine a target router from the plurality of routers and obtain information about the target router, where an extranet associated with the target router and a floating IP address of a port of a virtual machine resource are in a same network, the dependent cloud resource of the network resource includes the target router, and the resource information group of the network resource includes the information about the target router.

Optionally, the resource information group includes resource information of the to-be-processed cloud resource; the to-be-processed cloud resource is a volume resource; and a resource information group of the volume resource includes a size of the volume resource.

Optionally, the to-be-processed cloud resource is located in a source cloud, and the physical node 300 may further include a transceiver 340. The processor 310, the memory 320, and the transceiver 340 may be connected by using the bus system 330, and the transceiver 340 is specifically configured to send the resource topology template to a destination cloud, to clone or migrate, in the destination cloud, the to-be-processed cloud resource in the source cloud based on the resource topology template.

It should be understood that the physical node 300 according to this embodiment of the present disclosure may be corresponding to the physical node 200 in this embodiment of the present disclosure, may be corresponding to the clone node in the source cloud in FIG. 1, and may be corresponding to a corresponding body that performs the method 100 according to this embodiment of the present disclosure. In addition, the foregoing and other operations and/or functions of the modules of the physical node 300 are respectively intended to implement corresponding procedures of the methods in FIG. 1 to FIG. 9. For brevity, details are not described herein again.

Therefore, the physical node in this embodiment of the present disclosure obtains the dependent cloud resource of the to-be-processed cloud resource and the resource information group of the to-be-processed cloud resource; generates the resource topology template that includes the resource information group of the to-be-processed cloud resource, where the resource topology template can indicate the dependency relationship between the to-be-processed cloud resource and the dependent cloud resource; and may clone or migrate the to-be-processed cloud resource based on the resource topology template, so that a plurality of cloud resources can be automatically cloned or migrated, attributes of the cloud resources are ensured to remain unchanged, a prior-art operation of manually cloning or migrating a single resource is not required, and a dependency relationship between cloud resources can be replicated, so as to improve replication efficiency.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

Methods or steps described in the embodiments disclosed in this specification may be implemented by hardware, a software program executed by a processor, or a combination thereof. The software program may reside in a random access memory (RAM), a memory, a read-only memory (ROM), an electrically programmable ROM (EPROM), an electrically erasable programmable ROM (EEPROM), a register, a hard disk, a removable disk, a CD-ROM, or any other form of storage medium known in the art.

The present disclosure is described in detail with reference to the accompanying drawings and in combination with the embodiments, but the present disclosure is not limited thereto. Various equivalent modifications or replacements can be made to the embodiments of the present disclosure by a person of ordinary skill in the art without departing from the spirit and essence of the present disclosure, and the modifications or replacements shall fall within the scope of the present disclosure.

What is claimed is:

1. A cloud resource processing method, comprising:
   determining a cloud resource, the cloud resource comprising a network resource;
   obtaining a dependent cloud resource of the cloud resource and a resource information group of the cloud resource, wherein the dependent cloud resource of the network resource comprises a subnet resource of the network resource, and wherein the resource information group comprises resource information of the dependent cloud resource and information about the subnet resource;
   generating a resource topology template, wherein the resource topology template comprises the resource information group of the cloud resource and a dependency relationship between the cloud resource and the dependent cloud resource;
   cloning or migrating the cloud resource based on the resource topology template;
   determining, based on the information about the subnet resource, at least one router associated with the subnet resource;
   obtaining extranet information of each of the at least one router; and
   based on the extranet information of each router, determining a target router from the at least one router and obtaining information about the target router, wherein an extranet associated with the target router and a floating IP address of a port of a virtual machine resource are in a same network, the dependent cloud resource of the network resource comprises the target router, and the resource information group of the network resource comprises the information about the target router.

2. The method according to claim 1, wherein the resource information group comprises resource information of the cloud resource;
   the cloud resource comprises a virtual machine resource;
   a dependent cloud resource of the virtual machine resource comprises at least one of a hardware specifications resource, a volume resource, or a network resource; and
   a resource information group of the virtual machine resource comprises at least one of attribute information of the virtual machine resource, information about the hardware specifications resource, information about the volume resource, or information about the network resource.

3. The method according to claim 1, wherein the method further comprises:
   determining, based on the information about the subnet resource, at least one router associated with the subnet resource, wherein the dependent cloud resource of the network resource comprises the at least one router; and obtaining information about each of the at least one router, wherein the resource information group of the network resource comprises the information about each router.

4. The method according to claim 1, wherein the resource information group comprises resource information of the cloud resource;

the cloud resource comprises a volume resource; and a resource information group of the volume resource comprises a size of the volume resource.

5. The method according to claim 1, wherein the cloud resource is located in a source cloud; and the cloning or migrating the cloud resource based on the resource topology template comprises:

sending the resource topology template to a destination cloud, to clone or migrate clone or migrate, in the destination cloud, the cloud resource in the source cloud based on the resource topology template.

6. A physical node, comprising a memory and a processor, wherein the memory is configured to store an instruction, and the processor is configured to execute the instruction stored in the memory, so that the processor performs:

determining a cloud resource, the cloud resource comprising a network resource;

obtaining a dependent cloud resource of the cloud resource and a resource information group of the cloud resource, wherein the dependent cloud resource of the network resource comprises a subnet resource of the network resource, and wherein the resource information group comprises resource information of the dependent cloud resource and information about the subnet resource;

generating a resource topology template, wherein the resource topology template comprises the resource information group of the cloud resource and a dependency relationship between the cloud resource and the dependent cloud resource;

cloning or migrating the cloud resource based on the resource topology template;

determining, based on the information about the subnet resource, at least one router associated with the subnet resource;

obtaining extranet information of each of the at least one router; and based on the extranet information of each router, determining a target router from the at least one router and obtaining information about the target router, wherein an extranet associated with the target router and a floating IP address of a port of a virtual machine resource are in a same network, the dependent cloud resource of the network resource comprises the target router, and the resource information group of the network resource comprises the information about the target router.

7. The physical node according to claim 6, wherein the resource information group comprises resource information of the cloud resource;

the cloud resource comprises a virtual machine resource;

a dependent cloud resource of the virtual machine resource comprises at least one of a hardware specifications resource, a volume resource, or a network resource; and a resource information group of the virtual machine resource comprises at least one of attribute information of the virtual machine resource, information about the hardware specifications resource, information about the volume resource, or information about the network resource.

8. The physical node according to claim 6, wherein the processor further performs:

determining, based on the information about the subnet resource, at least one router associated with the subnet resource, wherein the dependent cloud resource of the network resource comprises the at least one router; and obtaining information about each of the at least one router, wherein the resource information group of the network resource comprises the information about each router.

9. The physical node according to claim 6, wherein the resource information group comprises resource information of the cloud resource;

the cloud resource comprises a volume resource; and a resource information group of the volume resource comprises a size of the volume resource.

10. The physical node according to claim 6, wherein the cloud resource is located in a source cloud; and the cloning or migrating the cloud resource based on the resource topology template comprises:

sending the resource topology template to a destination cloud, to clone or migrate clone or migrate, in the destination cloud, the cloud resource in the source cloud based on the resource topology template.

11. A non-transitory computer readable storage medium having computer usable program code which, when executed by a computing device, causes the computing device to perform:

determining a cloud resource, the cloud resource comprising a network resource;

obtaining a dependent cloud resource of the cloud resource and a resource information group of the cloud resource, wherein the dependent cloud resource of the network resource comprises a subnet resource of the network resource, and wherein the resource information group comprises resource information of the dependent cloud resource and information about the subnet resource;

generating a resource topology template, wherein the resource topology template comprises the resource information group of the cloud resource and a dependency relationship between the cloud resource and the dependent cloud resource;

cloning or migrating the cloud resource based on the resource topology template;

determining, based on the information about the subnet resource, at least one router associated with the subnet resource;

obtaining extranet information of each of the at least one router; and based on the extranet information of each router, determining a target router from the at least one router and obtaining information about the target router, wherein an extranet associated with the target router and a floating IP address of a port of a virtual machine resource are in a same network, the dependent cloud resource of the network resource comprises the target router, and the resource information group of the network resource comprises the information about the target router.

12. The non-transitory computer readable storage medium according to claim 11, wherein the resource information group comprises resource information of the cloud resource;

the cloud resource comprises a virtual machine resource;

a dependent cloud resource of the virtual machine resource comprises at least one of a hardware specifications resource, a volume resource, or a network resource; and a resource information group of the virtual machine resource comprises at least one of attribute information of the virtual machine resource, information about the hardware specifications resource, information about the volume resource, or information about the network resource.

13. The non-transitory computer readable storage medium according to claim 11, wherein the method further comprises:

determining, based on the information about the subnet resource, at least one router associated with the subnet resource, wherein the dependent cloud resource of the network resource comprises the at least one router; and obtaining information about each of the at least one router, wherein the resource information group of the network resource comprises the information about each router.

14. The non-transitory computer readable storage medium according to claim 11, wherein the resource information group comprises resource information of the cloud resource;

the cloud resource comprises a volume resource; and a resource information group of the volume resource comprises a size of the volume resource.

* * * * *